United States Patent [19]
Tai et al.

[11] Patent Number: 5,236,167
[45] Date of Patent: Aug. 17, 1993

[54] PEDESTAL BASE WITH REMOVABLE RECEPTACLE

[75] Inventors: Patrick C. Tai, Hillsborough, Calif.; Johannes P. Juffermans, Maple, Canada

[73] Assignee: Winward International Inc., Union City, Calif.

[21] Appl. No.: 942,586

[22] Filed: Sep. 9, 1992

[51] Int. Cl.$^5$ .................................. F16M 13/00
[52] U.S. Cl. ........................... 248/529; 47/40.5; 206/423; 248/188.7
[58] Field of Search .............. 248/188.7, 529, 528, 248/524, 525, 526; 47/40.5; 206/423

[56] References Cited

U.S. PATENT DOCUMENTS

| | | | |
|---|---|---|---|
| 1,287,069 | 12/1918 | Martin | 47/40.5 |
| 2,448,304 | 9/1948 | Gabel | |
| 2,609,169 | 9/1952 | Kroeger | 47/40.5 |
| 2,980,377 | 4/1961 | Nielsen | |
| 3,038,688 | 6/1962 | Thorburn | 47/40.5 |
| 4,159,096 | 6/1979 | Chase | |
| 4,406,437 | 9/1983 | Wright | |
| 4,610,356 | 9/1986 | Porter | 206/423 |
| 4,712,758 | 12/1987 | Cushera | |
| 4,763,866 | 9/1988 | Sinchok | |
| 4,911,391 | 3/1990 | Ellis | |
| 4,949,502 | 8/1990 | Anderson | 248/526 |
| 5,074,514 | 12/1991 | Smith | 248/524 |
| 5,114,113 | 5/1992 | Krinner | 248/525 |

Primary Examiner—J. Franklin Foss
Attorney, Agent, or Firm—Julian Caplan

[57] ABSTRACT

A pedestal stand for supporting an object with a post, such as an artificial tree with a trunk, substantially upright on a support surface. The pedestal stand includes first and second planar leg members slidably interconnected to form a hub with a socket. Each leg member includes first and second opposite legs which extend radially from the hub and are adapted to rest on the support surface. A receptacle is adapted and shaped to snugly receive the post. The receptacle is slidably and concentrically nested in a substantially upright position within the socket and is readily removable from the socket. In another aspect of the invention, the disassembled pedestal stand and a collapsed artificial tree are enclosed in a package for shipping. The leg members lie in juxtaposition to each other in the package, and the ends of the trunk substantially abut the ends of the package. The receptacle is disposed on the butt end of the tree trunk preventing the butt end from rupturing the package.

6 Claims, 2 Drawing Sheets

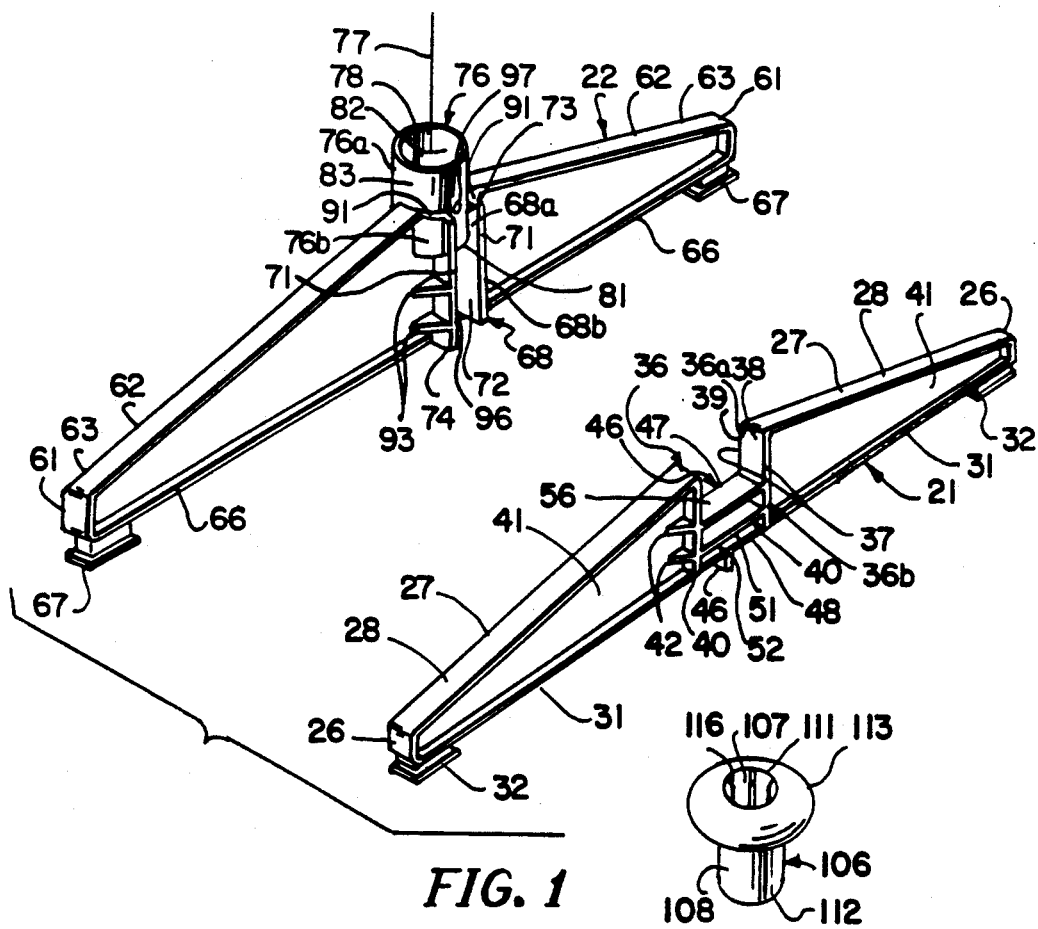
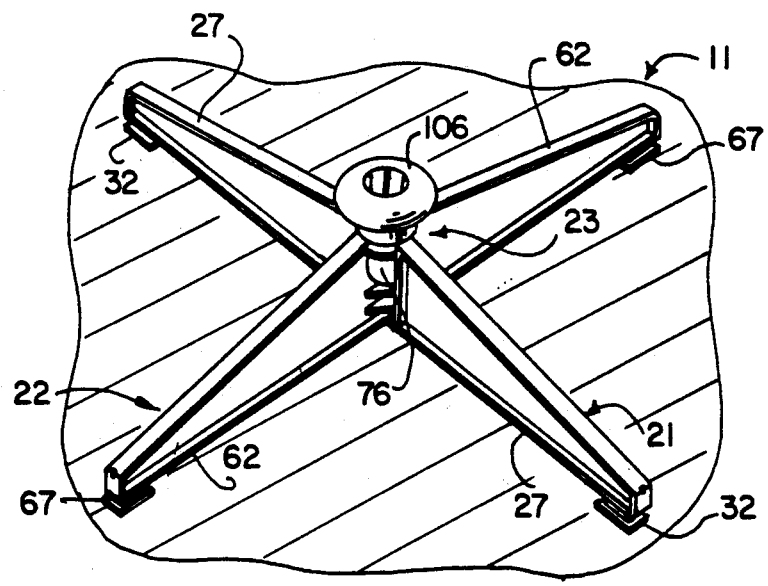

PEDESTAL BASE WITH REMOVABLE RECEPTACLE

BACKGROUND OF THE INVENTION

1. Field of the Invention

This invention relates in general to support stands and pertains, more specifically, to knock-down construction stand having a pedestal base for artificial Christmas trees. The invention is characterized by use of a receptacle for the butt end of the tree which fits into a socket in the pedestal and protects the container in which the tree and stand are packaged from damage during transportation.

2. Prior Art

A variety of stands with pedestal like bases have been provided for supporting objects with upright poles or posts such as artificial trees. Several of these stands can be readily disassembled and have a central tubular section for supporting the vertical poles or posts, but these central sections are generally integral to the support structure of the stand and not removable (See Cuschera, U.S. Pat. No. 4,712,758; Chase, U.S. Pat. No. 4,159,096; Wright, U.S. Pat. No. 4,406,437; Sinchok, U.S. Pat. No. 4,763,866; and Ellis, U.S. Pat. No. 4,911,391). Other stands have receptacles for receiving the pole or post which are not part of the support structure of the stand, but which are also not designed to be removed therefrom (See Gabel, U.S. Pat. No. 2,448,304). One stand available for supporting trees includes a removable receptacle or cup, but the receptacle is not designed to be quickly mounted to the pole or post. Nor is the pole or post removable from the receptacle to permit reuse of the receptacle. Furthermore, the stand cannot be readily disassembled into smaller components for ease of storage and transportation (See Nielsen et al., U.S. Pat. No. 2,980,377).

In shipping artificial trees or other objects with posts or poles, it has been found that the butt end of the pole or post sometimes punctures the shipping package causing damage to the object. None of the aforementioned stands includes a removable receptacle which is designed to be mounted on an artificial tree during shipment of the tree and disassembled stand and to be easily mounted in the assembled stand for supporting the tree in an upright position.

Accordingly, a primary object of the present invention is to provide a pedestal base with a removable receptacle sized to snugly fit the butt end of the tree during shipment so as to prevent puncturing the shipping package by the butt end.

Another object of the invention is to provide a pedestal base of the above character which can be easily disassembled into planar components for ease of shipping.

Another object of the invention is to provide a pedestal base of the above character which is provided with a socket for easily and slidably receiving the receptacle.

SUMMARY OF THE INVENTION

In general, the invention consists of a pedestal stand for supporting an object with a post, such as an artificial tree with a trunk, substantially upright on a support surface. The pedestal stand includes first and second planar leg members slidably interconnected to form a hub with a socket. Each leg member includes first and second legs which extend radially from the hub and are adapted to rest on the support surface. A receptacle having an inner surface with a plurality of ribs extending the length thereof and a blunt closed end is adapted and shaped to snugly receive the post. The receptacle is slidably and concentrically nested in a substantially upright position within the socket and is removable therefrom.

In another aspect of the invention, the disassembled pedestal stand and a collapsed artificial tree with a trunk are enclosed in a package for shipping. The first and second leg members lie in juxtaposition to each other in the package, and the ends of the trunk substantially abut the ends of the package. The receptacle is disposed on the butt end of the tree trunk, preventing the butt end from rupturing the package.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 is an isometric view of a disassembled pedestal stand in accordance with the present invention.

FIG. 2 is an isometric view of another embodiment of the pedestal stand in accordance with the invention shown in an assembled position.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 3:
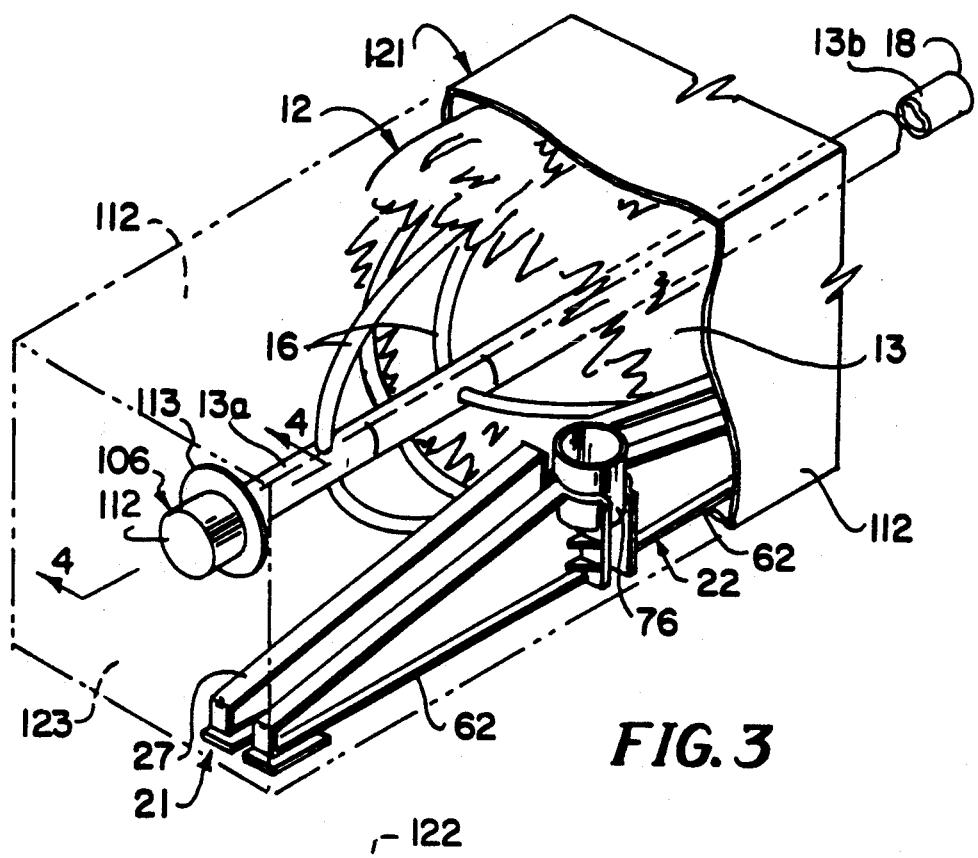
FIG. 3 is an isometric view of another embodiment of a disassembled pedestal stand in accordance with the invention in a package with a collapsed artificial tree.
Figure 4:
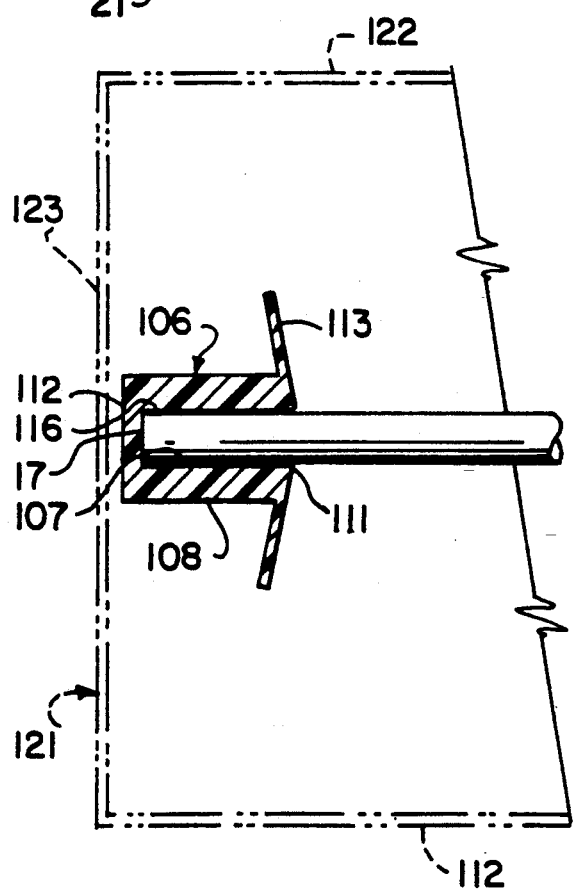
FIG. 4 is a cross-sectional view of the package shown in FIG. 3 taken along the line 4—4 of FIG. 3.

Turning now to the drawings, wherein like components are designated by like reference numerals throughout the various figures, attention is directed to FIGS. 1 through 4.

Pedestal stand 11 is designed to support an object with a support post, such as an artificial tree 12 with a cylindrical tubular trunk 13, substantially upright on a support surface 14. A typical artificial tree 12 includes branches 16. Trunk 13 has a first end portion 13a with a first butt end 17, which is often pointed or of a relatively small diameter, and a second end portion 13b with a second tip end 18. Pedestal stand 11 includes a plurality of planar leg members in the form of first leg member 21 and second leg member 22 which slidably interconnect into an assembled condition to form a hub 23. Leg members 21 and 22 can be injection molded from a suitable plastic material, and each includes legs which extend radially from hub 23 and are adapted to rest on support surface 14.

First leg member 21 has opposite substantially parallel ends 26 and includes first and second opposite legs 27, each substantially in the form of an elongate right triangle when viewed in elevation. The conformation of each leg 27 includes top and bottom flanges 28 and 31. Top flange 28 tapers downwardly from hub 23 to an end 26 and forms the hypotenuse of the right triangle. Bottom flange 31 extends perpendicularly from hub 23 to end 26 and is substantially parallel to support surface 14 when pedestal stand 11 is in an assembled operational condition as shown in FIG. 2. Each leg 27 is adapted for engagement with support surface 14 and is formed with a pad 32 on bottom flange 31 adjacent end 26 for engaging the support surface.

Each of first and second legs 27 also includes first and second inner flanges 36 with upper and lower portions 36a and 36b which serve as opposed vertical first inner flanges. Inner flanges 36 have first and second opposite sides 37, a planar rectangular surface 38, an upper end 39 joined to top flange 28 of the respective leg 27, and a lower end 40 joined to horizontal bottom flange 31 of the leg. Inner flanges 36 form part of hub 23 and are substantially perpendicular to support surface 14 when pedestal stand 11 is in its assembled operational condition. The central or interior portion of each leg 27 is bordered by respective flanges 28, 31 and 36 and end 26 and consists of wall 41. Inner flanges 36 are each buttressed where they join wall 41 by a plurality of spaced apart gussets 42 in the form of right triangles. Each gusset 42 is generally parallel to bottom flange 31 and has one side joined to inner flange 36 and the adjoining perpendicular side joined to wall 41.

Legs 27 are joined at the middle of first leg member 21 by a solid rectangular shaped brace 46 which connects lower portion 36b of inner flanges 36 and serves to space inner flanges 36 apart in a substantially parallel and aligned position. Brace 46 includes top and bottom parallel flanges 47 and 48 and central rib 51, each substantially perpendicular to inner flanges 36, and support rib 52 interconnecting the centers of bottom flange 48 and central rib 51 and substantially perpendicular thereto. Top flange 47 is connected to opposed inner flanges 36 approximately half way between upper and lower ends 39 and 40 and has an upper surface 53 which serves as a top platform surface for brace 46. Bottom flange 48 is approximately coplanar with bottom flange 31 of first and second legs 27.

First and second opposite sides 37 of each inner flange 36 have lips 56 extending substantially along the length thereof. Lips 56 are recessed from surface 38 and protrude from sides 37 for guiding and positioning first leg member 21 with respect to second leg member 22 when the leg members are slidably interconnected in the manner discussed more fully below.

Second leg member 22 is very similar to first leg member 21 in appearance and construction and has opposite substantially parallel ends 61 and first and second opposite legs 62. Each leg 62 is also in the form of an elongate right triangle when viewed in elevation and includes a top flange 63 which tapers downwardly from hub 23 to an end 61 and a bottom flange 66 which extends perpendicularly from hub 23 to end 61. Each leg 62 is adapted for engagement with support surface 14 and is formed with a pad 67 on bottom flange 66 adjacent end 61 for engaging the support surface.

Each of first and second legs 62 of second leg member 22 also includes first and second inner plates 68 with upper and lower portions 68a and 68b which serve as opposed second inner flanges. Inner plates 68 have first and second opposite sides 71, a planar rectangular surface 72 of substantial area, and upper and lower ends 73 and 74. Inner plates 68 form part of hub 23 and are substantially perpendicular to support surface 14 when pedestal stand 11 is in its assembled operational condition.

Legs 62 are joined at the middle of second leg member 22 by a tubular shaped socket 76 having upper and lower portions 76a and 76b and provided with a central longitudinal axis 77. Socket 76 has a top open end 78 and a closed bottom end 81 and inner and outer surfaces 82 and 83. Socket 76 serves to space inner plates 68 apart in a substantially parallel and aligned position, with a portion of lower portion 76b formed in and extending through upper portion 68a of each inner plate 68. Socket 76 is aligned with respect to first and second legs 62 so that the central portion of lower portion 76b spans the distance between inner plates 68. Bottom end 81 is approximately perpendicular to plates 68 and axis 77 is approximately parallel thereto and equidistant therebetween.

Each leg 62 includes rims 91 which extend from upper end 73 on both sides 71 of inner plate 68 radially around outer surface 83 to top flange 63. Lower end 74 of each inner plate 68 is joined directly to bottom flange 66 of the leg. The central or interior portion of each leg 62 is bordered by respective inner plate 68 with socket 76 extending therethrough, top flange 63, end 61 and bottom flange 66 and consists of wall 92. Inner plates 68 are each buttressed where they join wall 92 by a plurality of spaced apart gussets 93 in the form of right triangles. Each gusset 93 is generally parallel to bottom flange 66 and has one side joined to inner plate 68 and the adjoining perpendicular side joined to wall 92.

First and second leg members 21 and 22 slidably interconnect at a substantially right angle for placement on support surface 14 as illustrated in FIG. 2. To so assemble pedestal stand 11, second leg member 22 is positioned over first leg member 21 with inner plates 68 perpendicular to and straddling inner flanges 36. With surface 72 of inner plates 68 abutting opposite sides 37 of inner flanges 36 and opposite sides 37 of the inner plates guided by lips 56 formed on the sides of the inner flanges, second leg member 22 is moved downwardly relative first leg member 21 until bottom end 81 of socket 76 abuts upper surface 53 of brace 46. When pedestal stand 11 is so assembled, socket 76 is disposed on upper surface 53 and upper portion 76a is sandwiched between upper portion 36a of inner flanges 36. Brace 46 is sandwiched between and hidden from view by lower portion 68b of inner plates 68. When pedestal stand 11 is placed on a support surface 14 in its assembled condition, socket 76 forms the center of hub 23 and central longitudinal axis 77 thereof is substantially perpendicular to the support surface.

First and second leg members 21 and 22 are retained in an assembled condition by opposed first and second retention tabs 96 formed on lower end 74 of each inner plate 68 of second leg member 22 (See FIG. 1). Retention tabs 96 protrude slightly from surface 72 of the inner plates and engage and snap around bottom flange 48 of brace 46 when the second leg member is slidably connected to the first leg member. To assist in retaining socket 76 and second leg member 22 in proper assembled position with respect to first leg member 21, socket 76 is formed with first and second abutment tabs 97 which protrude from outer surface 83 and are positioned thereon in approximate longitudinal alignment with and between upper ends 73 of inner plates 68. Abutment tabs 97 engage inner flanges 36 adjacent upper ends 39 thereof to reduce relative wobbling between first and second leg members 21 and 22.

Pedestal stand 11 includes a receptacle 106 for carrying first end portion 13a of tree trunk 13. Receptacle 106 can also be injection molded from a suitable plastic material and is generally tubular in conformation with inner and outer surfaces 107 and 108, a first open end 111 for receiving first trunk end portion 13a and a second end 112 which is substantially closed and relatively blunt. First end 111 is expanded and includes a flange 113 which extends outwardly from outer surface 108 and slightly downwardly from first end 111 toward second end 112. Although receptacle 106 is illustrated in the drawings as having a solid body, the receptacle can be hollowed at parts to reduce manufacturing costs and save weight so long as the structural integrity is maintained.

Inner surface 107 of receptacle 106 is substantially circular in cross section and is adapted and shaped to snugly receive first end portion 13a of cylindrical trunk 13. A plurality of longitudinal ribs 116 are formed along the length of inner surface 107 and protrude radially inward to engage first trunk end portion 13a. Several ribs 116 are illustrated in FIG. 1.

Receptacle 106 is removably carried by second leg member 22. More specifically, second blunt end 112 of receptacle 106 is inserted in socket 76 so that the receptacle is slidably and concentrically nested within the socket. When receptacle 106 is so disposed in socket 76 as part of an assembled pedestal stand 11, outer surface 108 of receptacle 106 abuts inner surface 82 of socket 76 and the receptacle is in a substantially upright position with respect to support surface 14. As can be seen, receptacle 106 is shaped to fit into socket 76 with a sliding fit.

Pedestal stand 11 is designed to be easily disassembled into components which can be inexpensively shipped in a relatively small container. Alternatively, pedestal stand 11 can be efficiently shipped with an artificial tree 12 which is collapsible in an elongate package 121 having sides 122 and first and second ends 123 (See FIG. 3). In the preferred method of packing, tree branches 16 and first and second leg members 21 and 22 are aligned substantially parallel with tree trunk 13, with first and second leg members 21 and 22 lying in juxtaposition to each other. Package 121 is sized to snugly enclose tree 12 and disassembled pedestal stand 11, with first butt end 17 and second tip end 18 of trunk 13 substantially abutting first and second ends 123 of the package. Most desirably, first end 17 is disposed in receptacle 106 so that trunk 13 is concentrically carried by the receptacle. By so fitting receptacle 106 over first end 17 of the tree trunk, second blunt end 112 of the receptacle engages and abuts against end 123 of package 121 preventing trunk first end 17 from rupturing package end 123 (See FIG. 4).

A significant feature of pedestal stand 11 is receptacle 106. The receptacle is readily removable from socket 76 in second leg member 22 and is designed to snugly carry first trunk end portion 13a of artificial tree 12. Receptacle 106 is designed to be easily mounted on first end portion 13a prior to shipping and serves to prevent trunk 13 from puncturing package 121. No hardening agent or screws need be used to mount receptacle 106 on trunk 12, and ribs 116 inside the receptacle assist in providing a tight fit between the receptacle and the tree trunk. After tree 12 has been delivered and unpacked, first and second leg members 21 and 22 are easily interconnected and receptacle 106, with tree 12 carried thereby, is simply inserted into socket 76 at the center of hub 23 to right the tree. Receptacle 106 is readily removable from socket 76 to assist in taking down tree 12, and can be removed from trunk 13 for use with other trees or objects.

It is apparent from the foregoing that a new and improved pedestal stand has been provided which includes a removable receptacle sized to snugly fit the butt end of a tree during shipment so as to hinder puncturing of the shipping package by the butt end. The pedestal stand can be easily disassembled into planar components for ease of shipping, and has a socket for easily and slidably receiving the receptacle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A pedestal stand for supporting an object such as a tree substantially upright on a support surface comprising a first planar leg member, a second planar leg member, said first leg member being formed with a first central vertical notch and first legs extending outward from said first notch, said second leg member being formed with a second central notch and second legs extending outward from said second notch, said leg members being vertically elongated and interconnecting by mutual interengagement of said first and second notches so that said first and second legs extend radially outward and said legs rest on said support surface, a hub formed on one said leg member, said hub having an elongated vertical bore open at its top and extending substantially from top to bottom of said one said leg member, a vertically elongated receptacle having a tubular inner surface shaped and adapted to snugly receive said object and having an outer surface complementary to said bore so that said receptacle slides down into said bore, said receptacle being slidably and concentrically nested in said bore in an upright position and readily removable from said bore, and a generally horizontal flange on an upper end of said receptacle larger than said hub to limit movement of said receptacle into said bore.

2. A pedestal stand as in claim 1, wherein said object includes a post with an end portion disposed in said receptacle.

3. A pedestal stand as in claim 2 wherein said object is an artificial tree and said post is the cylindrical trunk of the tree which has an end portion, and wherein said receptacle is generally tubular in conformation, has a first end which is open for receiving the trunk end portion and has a second end which is substantially closed and is relatively blunt.

4. A pedestal stand as in claim 3 wherein said receptacle has a circular inner surface and has a plurality of ribs extending the length thereof and protruding radially inward for engaging the trunk end portion.

5. A pedestal stand as in claim 1 wherein each said leg has a conformation which includes a top flange tapering downwardly from the hub and a bottom flange, said bottom flange having a pad mounted thereon for engaging said support surface.

6. A pedestal stand as in claim 1 wherein said first legs include opposed first inner flanges joined at the middle by a brace, said brace having a top platform surface, and second legs including opposed second inner flanges joined at the middle of said second leg member by said socket, said first and second leg members interconnected at a substantially right angle with said socket disposed on the platform surface and sandwiched between said first inner flanges.

* * * * *